Figure 1:
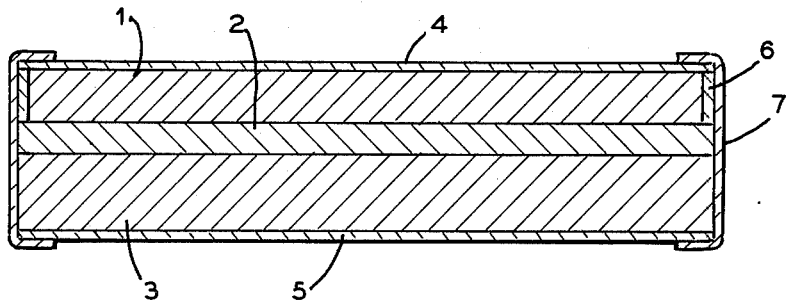

United States Patent

Liang et al.

[11] 3,959,012
[45] May 25, 1976

[54] COMPOSITE CATHODE MATERIALS FOR SOLID STATE BATTERIES

[75] Inventors: C. C. Liang, Andover; L. H. Barnette, West Medford, both of Mass.

[73] Assignee: P. R. Mallory & Co., Inc., Indianapolis, Ind.

[22] Filed: Apr. 25, 1974

[21] Appl. No.: 464,071

[52] U.S. Cl. .......................... 136/6 L; 136/100 R; 136/137
[51] Int. Cl.² ............... H01M 35/02; H01M 43/00
[58] Field of Search ............... 136/6 R, 6 L, 6 LF, 136/20, 83 R, 100 R, 153, 155, 137; 252/62.3 R, 62.3 S, 2 T, 2 U, 2 B, 439

[56] References Cited
UNITED STATES PATENTS

| | | | |
|---|---|---|---|
| 3,488,221 | 1/1970 | Shimotake et al. | 136/20 |
| 3,713,897 | 1/1973 | Liang | 136/153 |
| 3,730,775 | 5/1973 | Liang | 136/83 R |
| 3,791,867 | 2/1974 | Broadhead et al. | 136/6 R |
| 3,827,910 | 8/1974 | Cairns et al. | 136/6 LF |

Primary Examiner—Anthony Skapars
Attorney, Agent, or Firm—Ronald S. Cornell; Israel Nissenbaum; Charles W. Hoffmann

[57] ABSTRACT

A solid electrolyte cell is disclosed containing a lithium anode, a solid electrolyte of the lithium halide type and a cathode-active material consisting of a metal halide and a metal chalcogenide, said metals being selected from the group consisting of silver, copper, mercury, tin, lead, chromium, iron, cobalt, nickel, molybdenum, arsenic, antimony and bismuth.

17 Claims, 4 Drawing Figures

COMPOSITE CATHODE MATERIALS FOR SOLID STATE BATTERIES

FIELD OF THE INVENTION

This invention relates to solid electrolyte cells and more particularly to novel cathode-active materials for such cells.

BACKGROUND OF THE INVENTION

Miniaturization in electronics has been rapidly advancing in recent years and has resulted in increased demand for special power sources characterized by volume and weight comparable to those of the electronic components employed in the circuitry.

Success in meeting this demand has been achieved by employing solid electrolyte cells. Apart from the advantage of miniaturization, solid electrolyte cells and solid state batteries permit great flexibility in design. The electrolytes that are employed in solid state cells are ionic conductors which facilitate the ionic flow during the operation of the solid state cells. The performance of any given cell depends, among other factors, upon the specific resistance of the electrolyte, the nature of the conducting species, the transport number, the prior storage and operating temperature of the cell, and the products of the cell reactions as well as the specific cathode and anode materials.

THE INVENTION

It is an object of the present invention to provide a cathode active material for use with a solid electrolyte in solid state electrochemical cells.

It is another object of the present invention to provide a cathode material having good electronic conductivity.

It is a further object of the present invention to provide a solid electrolyte cell comprising an anode, a solid electrolyte and the cathode-active material.

These and other objects of the invention result from utilizing a cell comprising a novel cathode-active material, an active metal anode material, and a solid electrolyte based upon a halide of the active metal. The novel cathode active material of this invention is based upon mixtures of metal halides and at least one metal chalcogenide.

DETAILED DESCRIPTIONS

The anode-active material of this invention is preferably one of the electrochemically-active anodic materials capable of displacing hydrogen from water. Such anode metals comprise the light metals and include among others aluminum, magnesium, lithium, calcium, sodium and potassium. However, this invention is also operative, although not at as high an efficiency, with anodic metals below hydrogen in the electromotive series.

Preferably the solid electrolyte material for this cell should comprise a composition consisting essentially of lithium iodide, aluminum oxide, with or without lithium hydroxide. Suitable and preferred solid electrolyte systems for this cell are more completely described in U.S. Pat. No. 3,713,897, which issued 3 Jan., 1973. These solid electrolytes have a conductivity ranging between $5 \times 10^{-6}$ and $1 \times 10^{-5}$ ohm$^{-1}$ cm$^{-1}$ at room temperature.

The cathode-active materials of this invention comprise, as active materials, mixtures of a metal halide and at least one metal chalcogenide, said metal for said halide and chalcogenide being selected from metals of the group consisting of lead, silver, copper, mercury, nickel, chromium, iron, cobalt, arsenic, bismuth, antimony, molybdenum and tin. Said chalcogenides being the sulfides, selenides and tellurides of the above metals. The preferred halide species are the bromides and iodides, with the iodides being preferred.

We have found that when composite cathodes utilizing a mixture of metal halides and metal chalcogenides are used, the composite cathode can be discharged efficiently with substantially all of the active substances being electrochemically utilized.

Within the scope of the above composite cathode-active materials are included mixtures of metal halides and at least one metal chalcogenide including mixtures of metal iodides and one or more metal chalcogenides. The metal halides which may be utilized for this invention are: lead iodide, tin iodide, copper iodide, silver iodide, antimony iodide, arsenic iodide, mercury iodide, bismuth iodide, etc. The suitable metal chalcogenides include PbS, Ag$_2$S, HgS, Cu$_2$S, Sb$_2$S$_3$, As$_2$S$_3$, As$_2$Se$_3$, MoS$_2$, Bi$_2$S$_3$, PbSe, PbTe, Sb$_2$Te$_3$, and FeS$_2$.

The invention will be more completely understood by reference to the figures, wherein:

FIG. 1 shows a section through a test cell according to this invention, and

Figure 2:
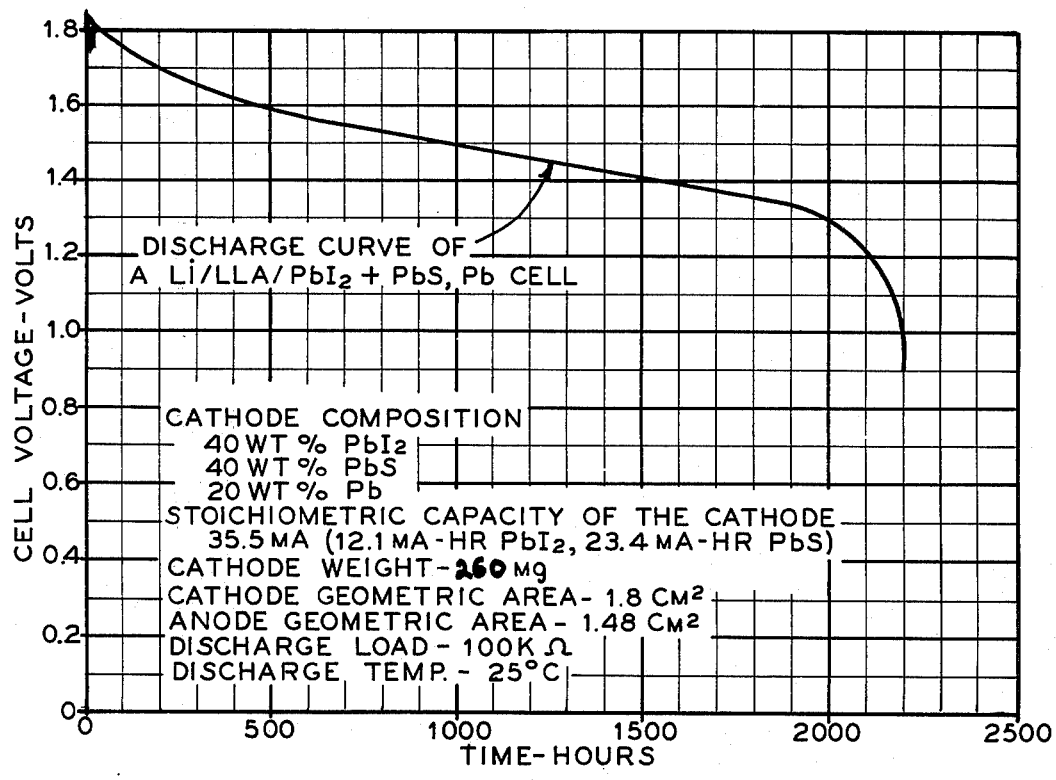
Figure 3:
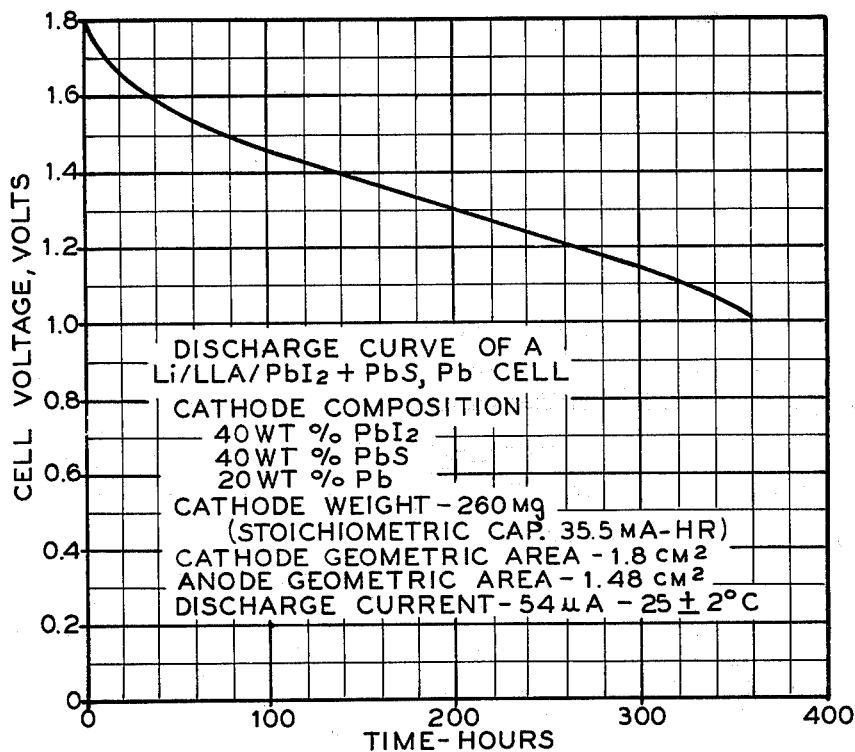
Figure 4:
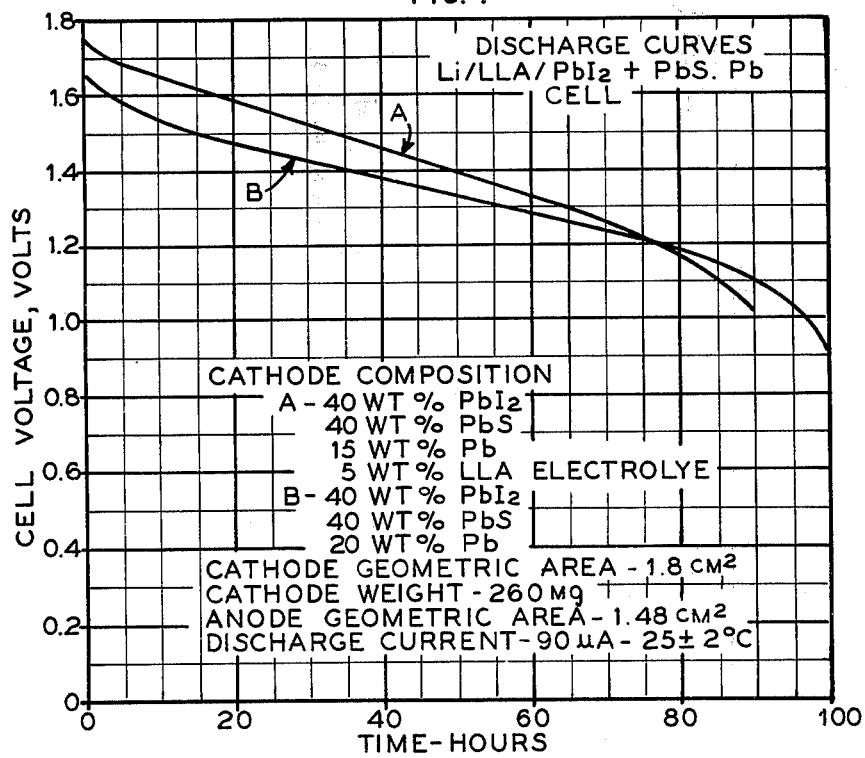

FIGS. 2–4 show the discharge curves of respresentative test solid state cells according to this invention containing the composite cathodes of this invention and discharged under the conditions set forth in the Examples. The test cells for this invention contained lithium anodes which were in the form of metal discs, and as electrolyte materials, the solid electrolyte described in the aforementioned U.S. Pat. No. 3,713,897, and particularly the electrolyte material LLA-412 (4 LiI, LiOH, 2 Al$_2$O$_3$).

The cathode materials of these test cells were the particular cathode-active mixtures specified in the individual examples and consisted of a mixture of the metal halide and one or more metal chalcogenides.

It is not necessary that the metal component of the halide and the chalcogenide be the same in each with regard to cathode active mixture.

It is useful to have admixed into the cathode-active materials small portions of the electrolyte. These portions serve as ionic conductors. In certain cells a small amount of metal powder may be included in the cathode to provide increased electronic conductivity. The latter is not necessary in some cases, but is useful particularly at low temperatures.

The solid state cells according to this invention are illustrated in FIG. 1, wherein anode 1 is a disc of lithium metal, and electrolyte 2 is a compressed pellet of the aforementioned preferred electrolyte. The cathode 3 is a compressed mixture of the cathode-active materials mentioned above. On either side of the anode and the cathode are the anode current collector 4 and cathode current collector 5. These serve as the respective terminals of the cell of this invention. The anode assembly is surrounded by anode-retaining ring 6. The entire cell is coated and insulated around its periphery by the insulating cell wall 7.

EXAMPLE 1

The test cells according to FIG. 1 were fabricated according to the following procedure. Electrolyte layer 2 was formed in a steel die under pressure of about 10,000 PSI. The cathode-active materials, according to this invention powdered and mixed, were then spread on the compressed electrolyte layer and the cathode current collector was positioned on the cathode mixture. This assembly was then pressed under a pressure of 50,000 to 100,000 psi. A lithium metal disc was positioned on the other side of the electrolyte layer inside the anode retaining ring, and the anode current collector was placed on the outer side of the lithium disc. This entire assembly was again pressed at a pressure in a range of 25,000 to 50,000 psi to insure a good contact between the individual components of the cell. The entire cell was then coated and insulated around its periphery by shrinkfitting a tubular slice of a heat-shrinkable insulating polymer, such as ethylcellulose.

EXAMPLE 2

A cell was fabricated as described in Example 1 using the lithium anode and solid LLA-412 (4 LiI, LiOH, 2 $Al_2O_3$) electrolyte and utilizing a cathode-active composition consisting of 40 wt.% $PbI_2$, 40 wt.% PbS and 20 wt.% Pb. As calculated, the stoichiometric capacity of this cathode was 35.5 mA-Hr. The geometric area of the cathode was 1.8 cm². The cathode weight was 260 mg. The geometric area of the anode was 1.48 cm². The cell was discharged at 25°C with a load of 100K ohms. FIG. 2 is the discharge curve of this cell. This cell had an open circuit voltage of 2.0 ± .10 volts. The time in which the cell voltage fell below 0.9 volts was 2,200 hours, demonstrating that the cells of this invention possess excellent utilization of the cathode material. The cell voltage remained remarkably uniform and above 1 volt for substantially the entire useful life of the cell.

EXAMPLE 3

A test cell was fabricated as set forth in Example 1, containing as its cathode active material a mixture of 40 wt.% $PbI_2$, 40 wt.% PbS and 20 wt.% Pb. The cathode weight was 260 mg. (Stoichiometric capacity was 35.5mA-Hr). The cathode geometric area was 1.8cm². The anode geometric area was 1.48cm². The cell was discharged at a discharge current 54μA, at a temperature of approximately 25°C. The open circuit voltage of the cell was 2.0 ± .10 volts. The cell had a useful life (to 1 volt) at the above discharge rate for 350 hours. FIG. 3, is the discharge curve of the cell according to Example 3.

EXAMPLE 4

A cell was fabricated according to the procedure of Example 1 with the compact of example 2 and a further cell was fabricated utilizing as a cathode mixture 40 wt.% $PbI_2$, 40 wt.% PbS, 15 wt.% Pb, and 5 wt.% LLA-412 electrolyte. Both cells were discharged at a discharge current of 90μA, at a temperature of approximately 25°C. FIG. 4, shows the discharge curves of these two cells. The cell of cathode composition according to example 2, is labeled curve B, whereas the cell containing the added electrolyte is curve A. The improved initial voltage and discharge rate will be noted in the electrolyte-containing cell.

| Metal Halide | | Metal Chalcogenide | | Open Circuit Voltage against Lithium, volts |
|---|---|---|---|---|
| wt.% | | wt.% | | |
| Example 5 | CuI 40 | $Cu_2S$ | 40 | 1.95 ± 0.10 |
| Example 6 | $PbI_2$ 40 | PbS PbTe | 40 20 | 2.00 ± 0.10 |
| Example 7 | $PbI_2$ 40 | PbSe PbTe | 40 20 | 2.00 ± 0.10 |
| Example 8 | AgI 40 | $Ag_2S$ | 40 | 2.15 ± 0.10 |
| Example 9 | $SbI_3$ 40 | $Sb_2S_3$ | 40 | 2.35 |
| Example 10 | $PbI_2$ 40 | $MoS_2$ | 40 | 2.40 ± 0.10 |
| Example 11 | $SnI_2$ 40 | SnS | 40 | 1.98 ± 0.1 |

What is claimed is:

1. A solid state cell comprising an anode; a solid electrolyte; and a cathode comprising as cathode-active material a mixture of a metal halide and at least one metal chalcogenide, said metal halide being selected from the bromides and iodides of metals of the group consisting of lead, silver, copper, antimony, mercury, arsenic, bismuth, chromium, iron, cobalt, nickel, molybdenum and tin, said metal chalcogenide selected from the group consisting of the sulfides, selenides and tellurides of said metals.

2. The cell according to claim 1 wherein the cathode-active material is the sole electronic conductor in said cathode.

3. The cell according to claim 1 wherein said cathode comprises said cathode-active material and an electronic conductor.

4. The cell according to claim 1 wherein said cathode comprises the cathode-active material, an ionic conductor and an electronic conductor.

5. The cell according to claim 4 wherein said electronic conductor is a metal and said ionic conductor is the solid electrolyte.

6. The cell according to claim 1 wherein said anode is lithium and said solid electrolyte consists of lithium iodide, lithium hydroxide, and aluminum oxide.

7. The cell according to claim 1 wherein said solid electrolyte consists of lithium iodide and aluminum oxide.

8. The cell according to claim 1 wherein said cathode-active material consists of a mixture of $PbI_2$ and PbS.

9. The cell according to claim 1 wherein said cathode-active material is a mixture of CuI and $Cu_2S$.

10. The cell according to claim 1 wherein said cathode-active material consists of a mixture of $PbI_2$, PbS and PbTe.

11. The cell according to claim 1 wherein said cathode-active material consists of a mixture of $PbI_2$, PbSe and PbTe.

12. The cell according to claim 1 wherein said cathode-active material consists of a mixture of $PbI_2$, PbS and PbSe.

13. A cathode-active material comprising a mixture of a metal halide and at least one metal chalcogenide, said metal of the metal halide being selected from the group consisting of Pb, Ag, Cu, Sb, As, Hg, Bi, Mo, Sn, Ni, Cr, Fe, and Co; and said metal of said metal chalcogenide also selected from said group; said halide being selected from the bromides and iodides of said metals;

and said chalcogenides being selected from the sulfides, selenides and tellurides of said metals.

14. The cathode-active material according to claim 13 comprising a mixture of $PbI_2$ and PbS.

15. The cathode-active material according to claim 13 comprising a mixture of CuI, and $Cu_2S$.

16. The cathode-active material according to claim 13 comprising a mixture of $PbI_2$, PbS and PbTe.

17. The cathode-active material according to claim 13 comprising a mixture of $PbI_2$, PbSe and PbTe.

* * * * *